United States Patent [19]

Kuehn

[11] Patent Number: 4,658,389
[45] Date of Patent: Apr. 14, 1987

[54] TRACK FOLLOWER SYSTEM FOR CORRECTING TANGENT ERRORS IN AN OPTICAL RECORD SCANNING SYSTEM

[75] Inventor: Hans Kuehn, St. Georgen, Fed. Rep. of Germany

[73] Assignee: Deutsche Thomson Brandt GmbH, Villingen, Fed. Rep. of Germany

[21] Appl. No.: 668,142

[22] Filed: Nov. 5, 1984

[30] Foreign Application Priority Data

Nov. 3, 1983 [DE] Fed. Rep. of Germany ....... 3339736

[51] Int. Cl.⁴ .............................................. G11B 7/00
[52] U.S. Cl. ..................................... 369/45; 250/201; 369/46; 369/112
[58] Field of Search .................... 369/43–46, 369/53, 54, 58, 109, 112; 350/486, 487, 611

[56] References Cited

U.S. PATENT DOCUMENTS

| | | | |
|---|---|---|---|
| 3,799,644 | 3/1974 | Street | 350/486 X |
| 3,974,327 | 8/1976 | Van Dijk | 369/45 |
| 4,462,095 | 7/1984 | Chen | 369/44 |
| 4,527,263 | 7/1985 | Nakagawa | 369/46 |

FOREIGN PATENT DOCUMENTS

| | | | |
|---|---|---|---|
| 0113137 | 9/1980 | Japan | 369/58 |
| 0017550 | 2/1983 | Japan | 369/45 |

OTHER PUBLICATIONS

"Adaptive Optics with Segmented Mirror or Deformable Mirror", Gaffard et al, Journal de Physique, Nov. 1980, p. C9-269-73.

*Primary Examiner*—Aristotelis M. Psitos
*Attorney, Agent, or Firm*—Horst M. Kasper

[57] ABSTRACT

A radially acting track follower system with an optical scanner for an audio or video record disc playback apparatus is provided. The apparatus generates three light spots disposed approximately on a straight line with an adjustable phase grate. The position of the light spots can be adjusted relative to the tangent of the track scanned. The central main luminous spot provides the track scanning wit respect to the information content of the track and possibly with respect to the generation of a focussing adjustment signal. The two outer or auxiliary luminous spots provide for a radial adjustment control. They are displaced in the direction of the track at an equal distance from the main light spot in a radially opposite direction to each other by equal amounts. Their light intensity is captured by detectors, and is processed to control signals which are fed to the drive converters for each of the reflection mirror parts, which are subdivided into three part sections and which are tiltably or shiftably supported. The converters can be based on electromechanical principles and are preferably piezoelectric converters. A control signal of, for example, 10 Kilohertz is superposed to the control signal for the converter of the outer part mirror sections and thus improves the scanning and guide following properties without the disadvantage of the superposition of the scanned information containing signal with the control signal.

19 Claims, 12 Drawing Figures

STATE OF THE ART

C = REFERENCE SIGNAL = $\frac{A_0 + B_0}{2}$

S = CONTROL SIGNAL a) WITHOUT ERROR ANGLE  b) WITH ERROR ANGLE

TRACK FOLLOWER SYSTEM FOR CORRECTING TANGENT ERRORS IN AN OPTICAL RECORD SCANNING SYSTEM

BACKGROUND OF THE INVENTION

1. Field of the Invention

The present invention relates to a radially acting track follower system with an optical scanning provision for an audio or video record replay apparatus, which employs a light source, a rotatable phase grating, a position adjustable reflection mirror provision, and an optical light bundling means for generating three luminous spots disposed substantially on a straight line, which straight line can be adjusted relative to the tangent at the track scanning position.

2. Brief Description of the Background of the Invention Including Prior Art

An optical track follower system for audio and video record players is disclosed in U.S. patent application Ser. No. 06/623,971 filed June 25, 1984 by Hans-Robert Kuhn. An optical scanner and reader for information on optical records is disclosed in U.S. patent application Ser. No. 628,770 filed July 9, 1984 by Arthur Kurz et al, now abandoned.

An optical three beam scanning system, also called a three beam optical pick-up, is known from the German Patent No. DE-PS 2,320,477. The radial error signal required for radial adjustment control is generated by two auxiliary luminous spots disposed in tangential direction relative to the track. These two luminous spots are at about equal distance from the center main luminous spot and the center points of the three luminous spots are approximately disposed on a straight line. They are displaced in a radial direction relative to the center of track such that for an about radial deviation of the track relative to the light spot, opposite effects are generated in the two auxiliary light spots. The reflected light intensities of the two auxiliary light spots are separated from each other and are read separately from the reflected light intensity of the main luminous spot via correspondingly ordinated detection means.

It is further known from the same patent that overall three light spots can be generated with a phase grating, which is provided such that it can be adjusted around a small angle for the purpose of a one time adjustment, as it is known in commercially available equipment, in a plane disposed vertically around a rotation point, which rotation point does not coincide with the center point of the phase grating but is instead disposed outside of the phase grating. A required rotation is performed mechanically via a lever with a set screw accessible from the outside of the apparatus.

The conventionally known optical scanning devices according to the three beam principle are associated with the following disadvantages relative to their track error correcting properties:

(i) They cannot be employed in situations where, based on the construction principle, only one radial control is performed with a tilting lever since the tangential error angle associated herewith results in such a shifting of the position of the auxiliary light spots relative to the track depending on the just scanned track radius that a maintenance of the track can not be achieved.

(ii) In the case of radial linear systems with a coarse and fine track adjustment control, the difficulty results that even in the case of very small deviations in the guiding of the radial adjustment, an unfavorable radial shifting of the the two auxiliary luminous spots relative to the track occurs because of the difference in curvature over the surface of the disc. This results in a defective maintenance of the track and/or can cause a loss of the track being followed.

It is known to employ movable mirrors or movable lens systems for the joined radial adjustment control of all three light beam bundles or, respectively, their luminous spots. Compare in this context the journal Funkschau 19/83, page 49.

It is further known from "Philips Technical Review" Vol. 40 (1982), page 154 that a radial acting control signal can be applied to the radial track follower system for improving the following properties. This radially acting control signal can, for example, be employed at a frequency of 600 Hertz and effect a radial back-and-forth oscillation of the three light spots with an amplitude of about 0.05 micrometers. The radial oscillation motion of the scanning device results in a superposition of the light intensities on the detection elements. By way of a corresponding sum formation, filtering and comparing with the original control signal, one can conclude about a possibly present asymmetry of the optical system and thus errors in the radial error signal can be determined and avoided. Such a provision, however, is associated with the disadvantage that the control signal is superposed on the scanned information signals, that is, it is located within the frequency spectrum of the information content. Therefore it is also not possible to employ a high frequency for the control signal since the energy parts of the information signals initially become larger with frequency. However, it would be very desirable to employ a substantially higher frequency as, for example, 500 or 600 Hertz, since only then a sufficient distance to the frequency spectrum of the radial error signals can be achieved.

It is also known from the initially recited German Patent No. DE-PS 2,320,477 according to FIG. 5 and the corresponding description in columns 5 and 6, that detection elements can be employed in each case with a parted surface. Thus it is possible to determine the intensity distribution of the light impinging on the detection elements and to produce controlled signals based on the formation of the difference. The control signals are then employed for controlling the position of the mirror 59 and 54 in the reference.

SUMMARY OF THE INVENTION

1. Purposes of the Invention

It is an object of the present invention to provide a optical scanner for replaying of a record which allows an independent radial adjustment control of the impingement locations of the auxiliary luminous spots relative to the course of the track.

It is a further object of the present invention to provide for a scanning system for the replay of records, where the radial adjustment control of the light spots is independent of the location of the main luminous spot.

It is another object of the present invention to provide a system for the optical scanning of records, which is safe and which is capable of maintaining the track.

These and other objects and advantages of the present invention will become evident from the description which follows.

2. Brief Description of the Invention

The present invention provides a radially acting track follower device for optical scanning of the surface of a record of a playback apparatus which comprises a light source, means for bundling the light originating from the light source, a rotatable phase grating disposed in the path of the light coming from the light source and generating three luminous spots disposed approximately on a straight line. A planar three part reflection mirror is provided where each of the parts can be controlled as to its position forming a position adjustable reflection mirror system for reflecting the light from the light source such that three luminous spots are generated on the record where the position of the spots is adjustable relative to the tangent of the track sensing location. A detection means serves to sense the light reflected from the record at the said luminous spots. An electronic processing means receives the signals generated in the detection means. The center spot causes the generation of the use signal and the auxiliary outer spots cause the generation of control signals for the radial track follower system. Electromechanical converters are connected to the electronic processing means, which converters are individually settable for adjusting the position of at least the outer parts of the three part reflection mirror for varying the angle formed by the connection line from the center point of the respective auxiliary light spot to the center point of the main light spot and the tangent at the optimum track sensing position of the main light spot.

A signal resulting from the center spot can be employed for controlling the focussing. The auxiliary light spots can impinge the record surface about in track direction at about equal distance from the main center spot, radially opposite to each other and displaced by about equal amounts. The outer parts of the reflection mirror can be tiltably disposed. The outer parts of the reflection mirror can be shifted with the electromechanical converter. The electromechanical converters of the two outer parts of the mirror can be excited by a control signal with a frequency of more than 1000 Hertz.

The two outer auxiliary light spots preferably oscillate by at most about 0.1 micrometer in a substantially radial, but opposite direction with respect to each other based on a corresponding control of the electromechanical converters. The auxiliary luminous spots for the track follower control can be coordinated to the detection means. An adding means can add the signals resulting from the two outer parts of the reflection mirror such that in case of an optimal position of the two auxiliary light spots relative to the track to be scanned a sum signal S equal to 50 percent results and an angular shifting results in a shift of the control signals in each case in a positive direction or a negative direction and where the thus determined control signal S controls the movable reflection mirror parts correspondingly. A read only memory can serve to store typical scanning error or proportional angle deviations for certain scanning radii of a certain record playback apparatus. A digital to analog converter can be connected to an output of the read-only memory, where the output signal of the digital to analog converter provides the control parameter for the controllable mirror parts, where both during regular operation as well as for a search finder run the accumulated time available from the information on the record is calculated as a binary signal sequence. Blocks comprising eight individual bits are employed as an address for the read only memory ROM.

Brackets can be disposed between a respective mirror part and the electromechanical converter for mounting the mirror part and for transmitting the motion generated in the electromechanical converter to the mirror part. The detection elements can be formed from at least two individually sensing detection elements for each of the outer parts of the reflection mirror. The parts of the reflection mirror can be semitransparent mirror parts.

There is further provided a method for radially tracking a track on a record with an optical track follower device which comprises generating light in a light source, scattering coherently the light coming from the light source with a phase grating to provide three beams of light, focussing the light coming from the phase grating onto a reflection mirror system comprising at least three parts, forming three separate luminous spots each corresponding to a one of the light beams on the surface of a record, where the luminous spots are disposed approximately along a straight line running at a certain angle relative to the tangent of the respective track on the surface of the record, collecting the light reflected from the record surface onto detection elements, and processing signals coming from the detection elements to generate a use signal and correction signals for adjusting the positions of the reflection mirror parts to assure a stable following of the track of the luminous spots.

The angle between the approximate straight line connecting the light spots and the tangent of the track on the record can be adjusted. The luminous spots on the surface of the record can be focussed depending on the characteristics of the signal received by a detection element, which corresponds to the center part of the reflection mirror.

The signals coming from the detection elements can be joined such that one resulting signal represents a parallel codirected motion of the two outer part reflection mirrors and wherein another resulting signal represents a parallel oppositely directed motion of the two outer reflection mirror parts. The two outer reflection mirror parts can be excited with a control signal having a frequency of more than 1000 Hertz with a resulting motion of not more than about 0.1 micrometer. Scanning error typical and/or proportional angle deviations corresponding to certain scanning radii can be stored in a memory storage. A signal coming from the memory storage can be converted with a digital to analog converter. An output signal of the digital to analog converter can be fed as a control parameter to a drive mechanism of the position controlled reflection mirror parts. Binary signal sequences can be calculated from the time passed by the running of the record to coordinate the values stored in the memory storage and from the position on the record.

According to the invention a planar, three part reflection mirror is employed for a radially acting track follower system. The two outer part mirrors of the reflection mirror in each case reflect one of the light beams of the auxiliary light spots and the center part reflects the light coming from the main luminous spot. At least the part mirrors, but if desired also the center mirror, which serves for the reflection of the main light beam going to the main luminous spot, can be movably disposed on a joint axis and they are in a force transmittting connection relative to electromechanical converters, which can adjust the position of the respective mirror. Thus at least the two outer part mirrors can be driven independently of each other in the same direction or in a relative opposite opposite direction and thus the angle can be varied, which is formed of the connection line of the center point of the auxiliary light spot in each case with the center point of the main light spot and the tangent at the optimum track scanning position of the main luminous spot.

This construction results in the following substantial advantages:

(i) A slight deviation of one of the luminous spots from its optimum position can be corrected separately by adjusting the respective converter.

(ii) In case an evaluation of the detection signals for the determination of an optical asymmetry is to be provided and to be controlled, then a delay has to be provided at one of the channels of the auxiliary light spots. This can also be performed easily by individually controlling the converters.

(iii) In case a nonuniform intensity distribution should occur based on any cause, then in case of readjustments of the auxiliary light spots around the center of the main light spot an intensity shifting of the main light spot would occur and thus the focussing affected therewith would be interfered with substantially. This possibility of disturbance is eliminated, if the phase grating serves only for the generation of three luminous spots and the part mirrors controlled with the converters influence exclusively the direction of the connection line of the center point of the auxiliary luminous spots in each case relative to the tangent at the scanning location and not the main luminous spot with a possible nonuniform intensity distribution.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
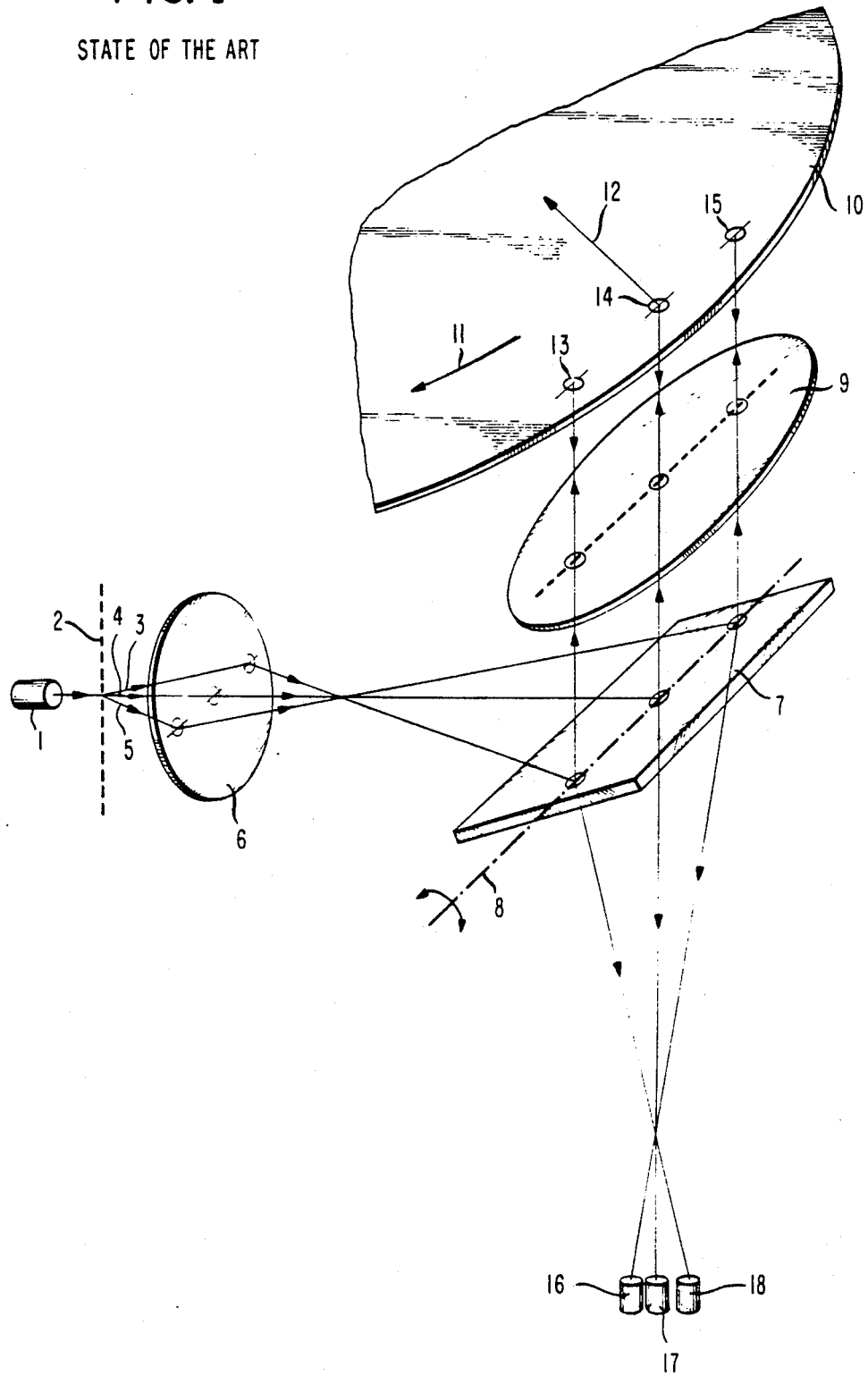
FIG. 1 is a schematic view of the path of the beam at an optical three beam scanning device with a phase grating according to the state of the art.

The present invention provides a radially acting track following system with an optical scanner for an audio or video record replay apparatus, which comprises a light source, a rotatable phase grating, a reflection mirror system adjustable with respect to its position and optical means for bundling the light and for generating three light spots disposed substantially on a straight line, which light spots can be adjusted in their position relative to the tangent of a track scanning location on the record. The central main luminous spot provides, after reflection according to the track information, a signal based on a detection means followed by a corresponding electronic processing. The resulting signal is employed to be used for generating the final function element signals and possibly for providing an automatic focussing control signal. The reflected bundles of the auxiliary luminious spots, which are disposed radially and oppositely at about equal distance relative to the main luminous spot and the light reflected from the spots is fed to separate detection means, which provide the automatic control signals for the radial track follower system. The reflection mirror 7 can be preferably planar and composed of three parts, where at least the outer parts 7a, 7c, which serve to reflect the light beams of the auxiliary luminous spots 13, 15, are tiltable or shiftable and, possibly, the center reflection mirror is also shiftable or tiltable, which center mirror serves for the reflection of the light beam bundle of the main luminous spot 14. Separate, individually operable electromagnetic converters 25, 26, 28, 35, 36, 37 can be driven independently of each other to actuate the mirrors such that in each case only one outer part mirror 7a or 7c or both together can be simultaneously directed in the same direction or in opposite direction and thus one can vary the angle which is formed by the connection line of the center point of the auxiliary luminous spots 13 or 15 to the center point and of the main luminous spot 14 and forms a tangent at the optimum track scanning position of the main luminous spot 14.

The electromagnetic converter (25, 28, 35, 37) of the two outer mirror parts 7a, 7c can be driven with a control signal of a frequency substantially higher than 600

Hertz. This causes the two auxiliary spots A equivalent to 13 and B equivalent to 15 to oscillate by an amount of about 0.05 micrometers substantially in a radial but opposite direction to each other based on the corresponding control of the two converters 25, 28 or, respectively, 35, 37.

The auxiliary light spots A equivalent to 13, B equivalent to 15 corresponding to the track follow control cooperate with detection elements 16, 18. The signals generated by the detection element 16 are added electronically to signals of the detection element 18 such that in case of an optimum position of the two auxiliary luminous spots A equivalent to 13, B equivalent to 15, relative to the track to be scanned, a sum signal S equal to 50 percent results while an angular rotation results in a shifting of the control signals in each case in a positive or negative direction. The thus determined control signal S controls correspondingly the movable mirror 7a, 7c.

The angle deviations typical for scanning errors and/or proportional angles are stored at certain scanning radii for a certain record player in a read-only-memory, and this read-only-memory is disposed ahead of a usual conventional digital to analog converter. The output signal of the digital to analog converter provides the control signal for the controllable mirror parts 7a, 7c. Both for the normal scanning processes as well as for the search run operation, binary signal sequences are calculated from the accumulated time present as information on the record and, for example, blocks consisting eight individual bits are employed as elements for the read-only-memory.

Figure 2:
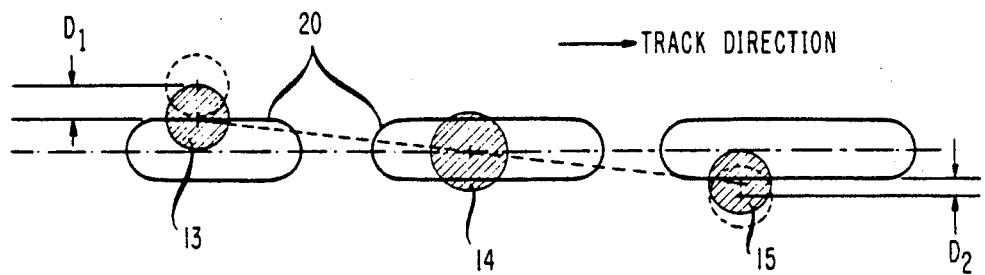
FIG. 2 is a schematic view of the operational principle of the three luminous spots with a scanning provision according to FIG. 1.
Figure 3:
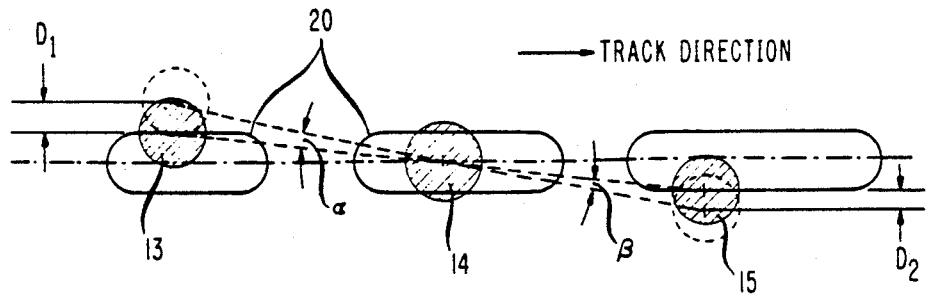
FIG. 3 is a similar view to FIG. 2, however, different error angles and are shown for the radial deviations $D_1$ and $D_2$ of the auxiliary luminous spots.

Referring now to FIG. 1 and 2, these figures relate to the initially described state of the art. The light bundle originating in laser source 1 passes on to a phase grate 2, where, because of diffraction, light bundles of higher order are generated. The light bundle of the orders above the first order are generally supressed. The three light bundles 3, 4, 5, of which in each case only one beam was shown, pass after the bundling through an optical system 6 onto a semi-transparent mirror 7. This semi-transparent mirror 7 can be tilted around its axis 8. The reflected light bundles 3, 4, 5 are focussed in an objective 9 onto the record disk 10 or, respectively, its reflecting surface to be scanned, such that the luminous spots 13, 14 and 15 are generated. The reading of the information and the control of the focus is performed with the aid of the main luminous spot 14. The luminous spots 13 and 15 are auxiliary luminous spots and are employed for detecting radial error scannings. The record 10 rotates in the direction of arrow 11 and the arrow 12 indicates the radial direction. The reflections of the light spots pass via the objective 9 through the mirror 7 to the corresponding detectors 16, 17, 18. A track section of a track along the dash-dotted line is shown in FIG. 2. The three light spots 13, 14, 15 are disposed with their center points on a dashed line, which is not a tangent relative to the track. The auxiliary luminous spots 13, 15 here impinge radially oppositely staggered with respect to the track. Their light reflecting surface spots reflect light which impinges the detector elements 16 and 18 as shown in FIG. 1. The main luminous spot 14 is disposed optimally on the track and at the middle of the three illustrated pits of FIG. 2. The unequal deviation of the auxiliary light spots, which is indicated by dashed lines, would result in an unequal captured light intensity by the detection elements 16 and 18, since a radial error is present and thus the light does not any longer impinge the main light spot. This can be recognized from the different size of the value $D_1$ and $D_2$. This allows the determination of a correction signal for the radial tangential error. FIG. 3 shows the unequal error angles $\alpha$ and $\beta$ corresponding to the unequal sizes $D_1$ and $D_2$. The relations are shown in FIG. 3 correspondingly in case of a different position of the auxiliary luminous spots 13 and 15 relative to the main luminous spot 14 and thus relative to the tangent of the track at the location of the main luminous spot 14. The corresponding mirror part sections have to be controlled in this case at different amplitudes and phases in order to assure that the relation $D_1 = D_2 = 0$ is reached.

Figure 4:
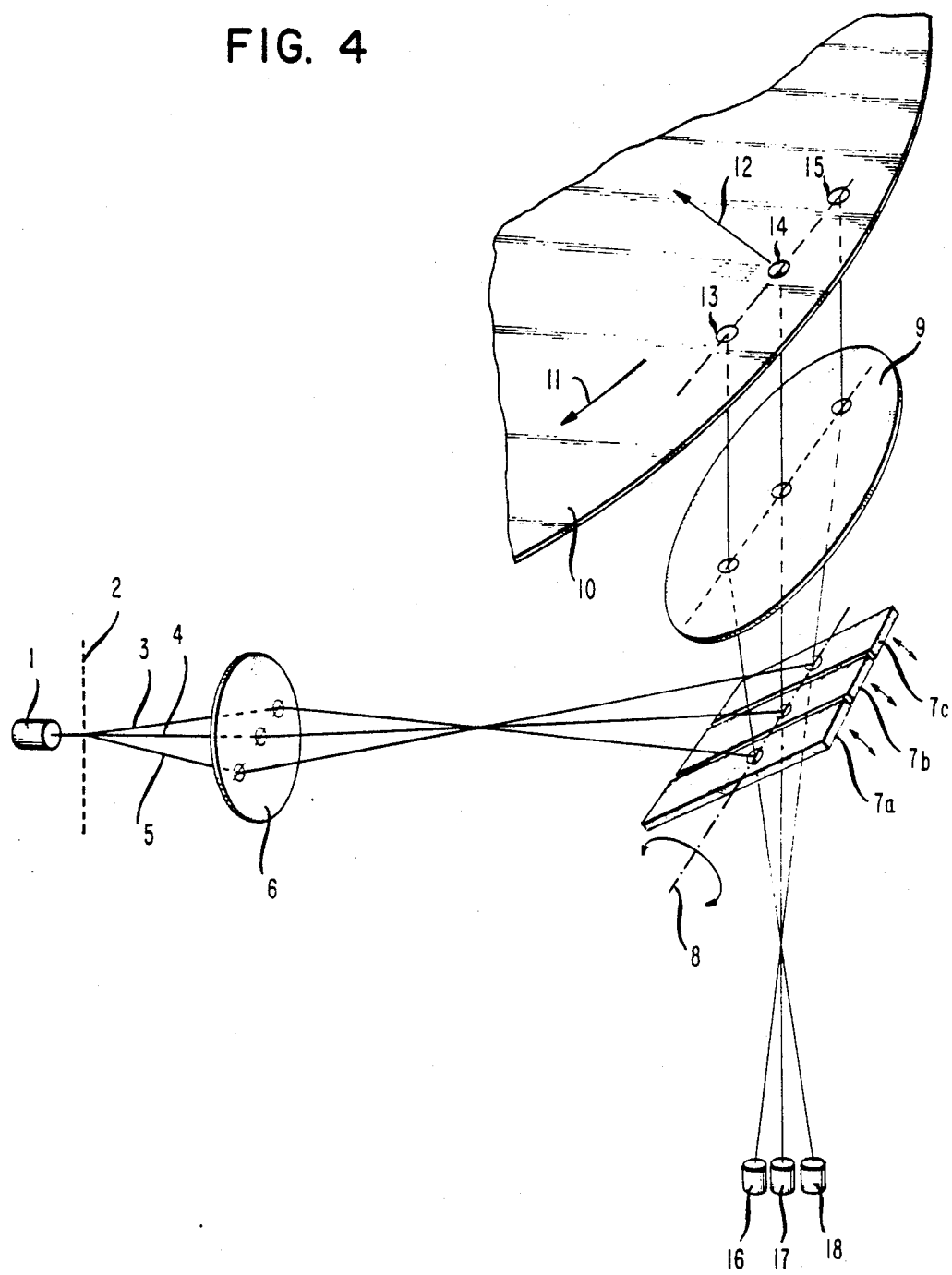
FIG. 4 is a view of the principle operation of a three part mirror according to the invention in an representation similar to that of FIG. 1.

The mirror illustrated in FIG. 4 according to the present invention is separated into the mirror parts 7a, 7b, 7c, which can not only be moved individually but can also be controlled around a joint axis 8. Thus it becomes possible to change the impingement location of the luminous spot individually or also as a desired combination for correcting a tangential error by moving in a radial direction. The outer mirror sections 7a and 7c transfer the light bundle of the auxiliary luminous spots 13 and 15 and the center mirror section 7b transfers the light bundle of the main luminous spot 14.

Figure 5:
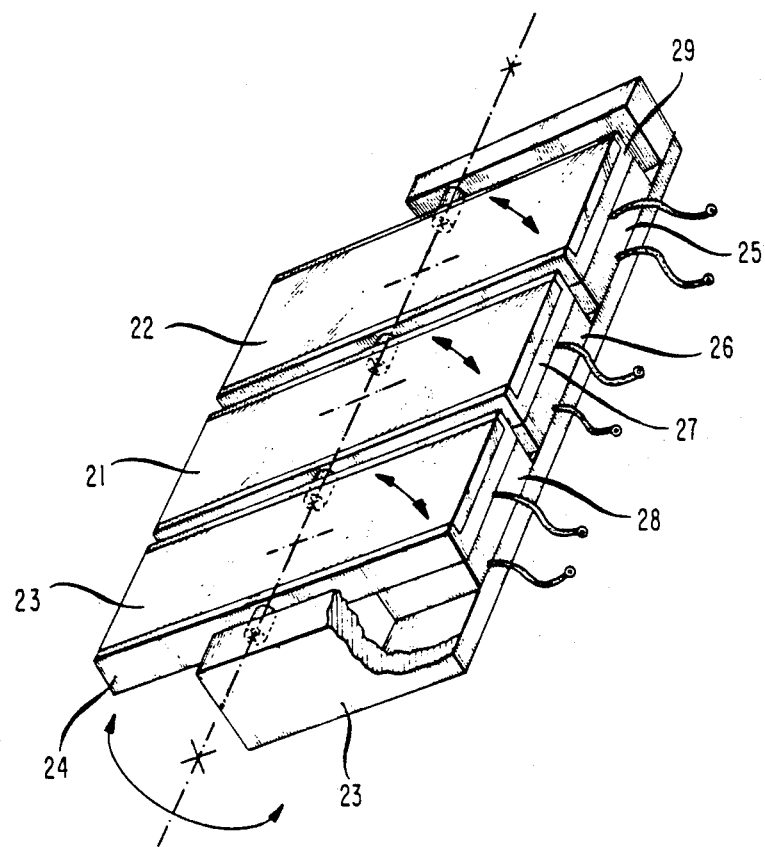
FIG. 5 is an embodiment according to the invention of a three part, individually controllable mirror in a perspective view.
Figure 6:
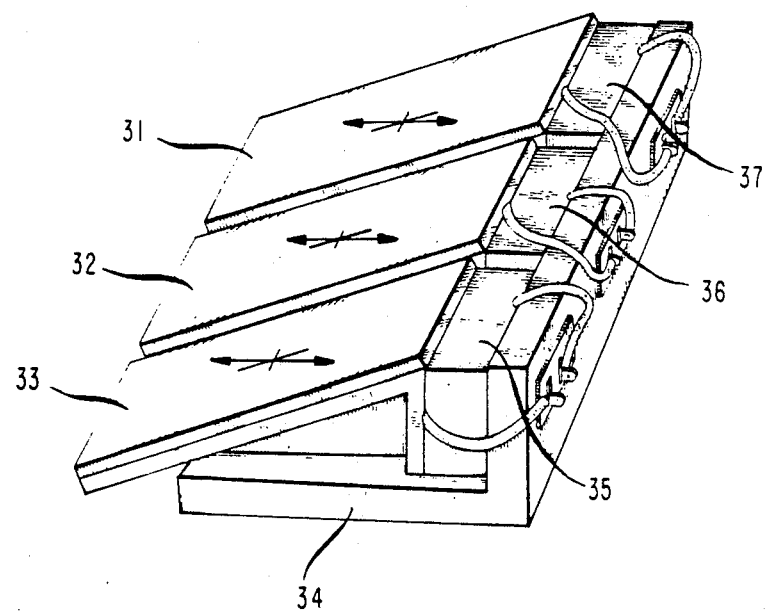
FIG. 6 is another perspective view of an invention embodiment of a three part, individually controllable mirror.

Instead of a rotation of the mirror section as illustrated in FIG. 5 around the axis 8, it is also possible to shift the mirror sections from a zero position, as will be illustrated further upon consideration of FIG. 6.

The same or corresponding positions were designated with the same numerals for FIGS. 1, 2, 3, 4.

FIGS. 5 and 6 show two different embodiments of mirrors, where the mirror part sections are driven by piezoelectric converters. Of course, it is possible to employ other electromechanical converters, for example, converters operating according to an electromagnetic or electrostrictive principle.

The embodiment illustrated in FIG. 5 shows a three mirror part section 21, 22, 23, which are attached to support bodies 24, 27, 29. The support bodies are movable based on the indicated axial pins around the dash-dotted axis, which is supported in the frame 23. The mirror part sections can be tilted independently of each other by a control signal based on the three piezoelelectric converters 25, 26, 28, as is indicated by arrows on the mirror sections 21, 22, 23.

The converters 35, 36, 37 are disposed between the spacially fixed frame 34 and the mirror section 31, 32, 33 such that the latter can be shifted in the direction of the arrows entered into this figure upon a corresponding actuation of the converter. Such a shifting also means a radial deviation of the luminous spots.

As mentioned the drive means for the two outer mirror sections can be excited with a superposed, oppositely poled control signal of for example 10 Kilohertz. In fact this can be achieved by having the two auxiliary luminous spots 13 and 15 oscillate with a radial deviation of for example D=0.05 micrometers around their ideal rest position on the track.

Figure 8:
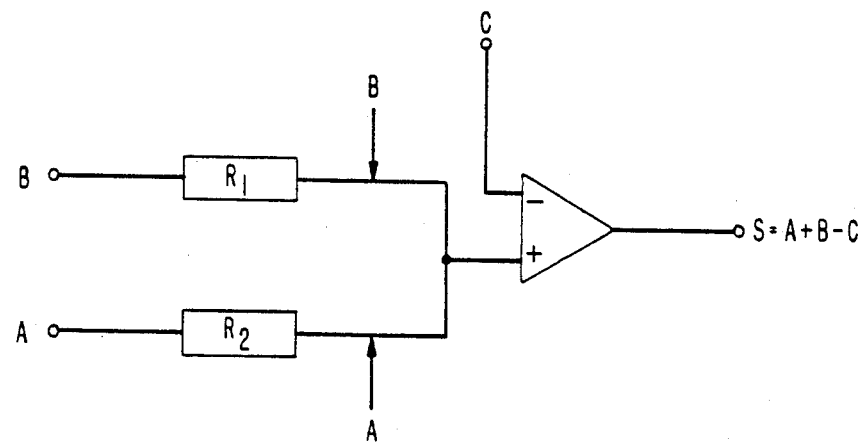
FIG. 8 is a block circuit diagram for the evaluation of the detection signals and for determining the control signals for the drive of the controllable mirror, in case a control signal is employed.

The block circuit diagram of FIG. 8 shows in a simplified way, how the detection signals A and B are evaluated and how the control signal S for the drive of the converter is determined from the signal of the outer mirror part sections. A reference signal $C = (A_0 + B_0)/2$ is applied to the minus input of the differential amplifier. The application of its control signal of the above mentioned kind is illustrated in FIG. 8.

Figure 7:
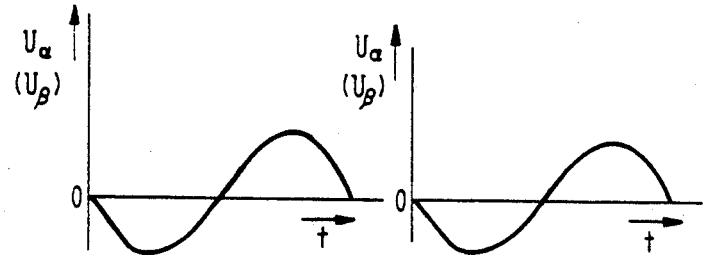
FIG. 7 is a sequence of graphical representations for explaining the generation of the detection signals with and without error angle.
Figure 7:
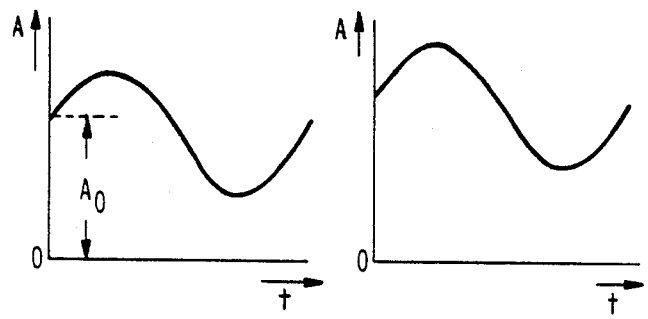
Figure 7:
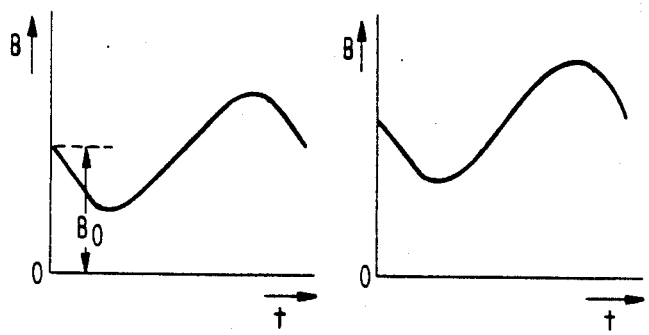
Figure 7:
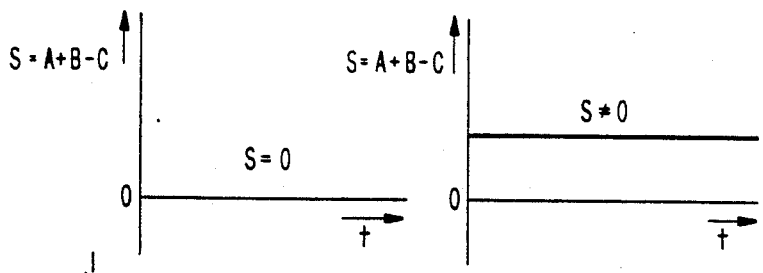

FIG. 7 illustrates graphically how the control signal $U_\alpha$ or, respectively, $U_\beta$ depend on the course of time during a period and below is shown the corresponding time course of the detector signals A and B (detectors 16 and 18 according to FIG. 4). According to FIG. 8 the detection signals are added via the resistor $R_1$ or respectively, $R_2$ at the (+) input of the differential amplifier and then following they are subtracted in the same amplifier from a reference voltage C. Upon a proper position of the auxiliary luminous spot detectors A equivalent to 13 and B equivalent to 15 relative to the track and with the value $C=(A_0+B)/2$, then the control signal S is equal 0 as is illustrated in FIG. 7a. A change in position of one of the mirror parts effects a shifting of the signals of the detectors in each case in a positive or a negative direction. The control voltage is then any longer 0 as shown in FIG. 7b. The control signal comprises no components of the radial error signal, since the sum of the radial parts of the captured light intensity on the detectors is 0 in case of a track shifting in a radial direction away from the auxiliary luminous spots. Thus some signal can be employed according to amount and direction as a control signal for the mirror part section control provision based on the above mentioned converters.

Figure 9:
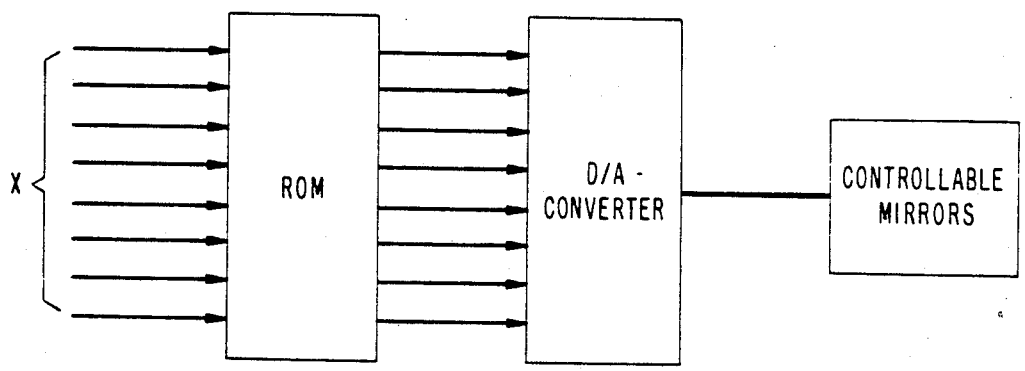
FIG. 9 is a view of a simplified block circuit diagram with a read-only-memory (ROM) ahead of a digital to analog converter as an additional device for controlling angle deviations of the auxiliary luminous spots ahead of time, for example, in case of a search finder run.

A block circuit diagram of an auxiliary provision is shown in FIG. 9. The auxiliary provision permits to take into consideration angular changes known in advance of the auxiliary luminous spots. The usual digital to analog converter, which produces the control signal for the drive converter can have a read-only-memory ROM predisposed. This read-only-memory has values X applied to its inputs, which values are read only memory addresses, which result from the calculation of the position in each case of the luminous spots on the information record disk.

Angular deviations known in advance are present for example if there is a dependence of the tangent error angle on the scanning radius based on the geometrical construction relations and this dependence is calculated both during regular scanning as well as during the mode of operation "search run" from the jump width, for example provided by tracks to be jumped over in each case. The number of the tracks to be jumped over under consideration of the already scanned tracks, which consist of for example eight individual bits, are employed as an address for the read only memory. In case of already scanned or finished tracks there is present the number of tracks, which were determined from the start of the track region of plate up to the momentary scanning point in radial direction. The determination of this numbers is calculated in case of a presently known record player apparatus from the accumulated time and thus can be readily used.

The advantage of this additional provision comprises the avoidance of erroneous scanning steps. Without the control of the in advance calculated angular deviations in case of extremely large tangent error angles and undesired locking of the radial service circuit can occur via the two auxiliary luminous spots unto the tracks neighboring to the main luminous spots. Thus this disturbance can be avoided and unequivocably according to the present invention.

It is also to be mentioned in the context of FIG. 9 that such an auxiliary provision is required for each of the two part mirrors for the auxiliary spots, if the known angle deviations for the two auxiliary luminous spots are different based on advance knowledge.

Figure 10A:
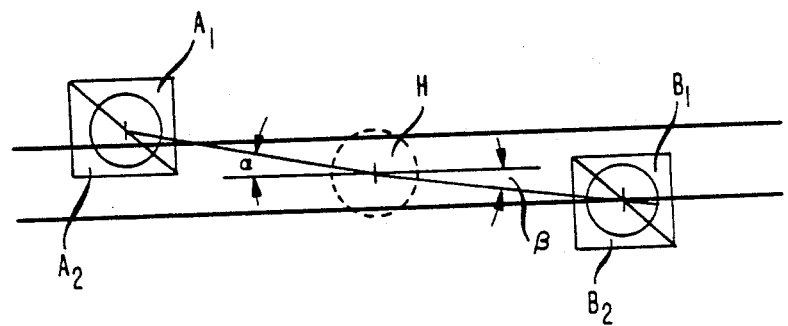
FIG. 10a is a schematic plan view of the auxiliary luminous spots and of subdivided detector elements and FIG. 10b is a block circuit diagram for the determination of the detector signals and for forming control signals for the drive of the individual part mirrors in case no control signal is employed.
Figure 10B:
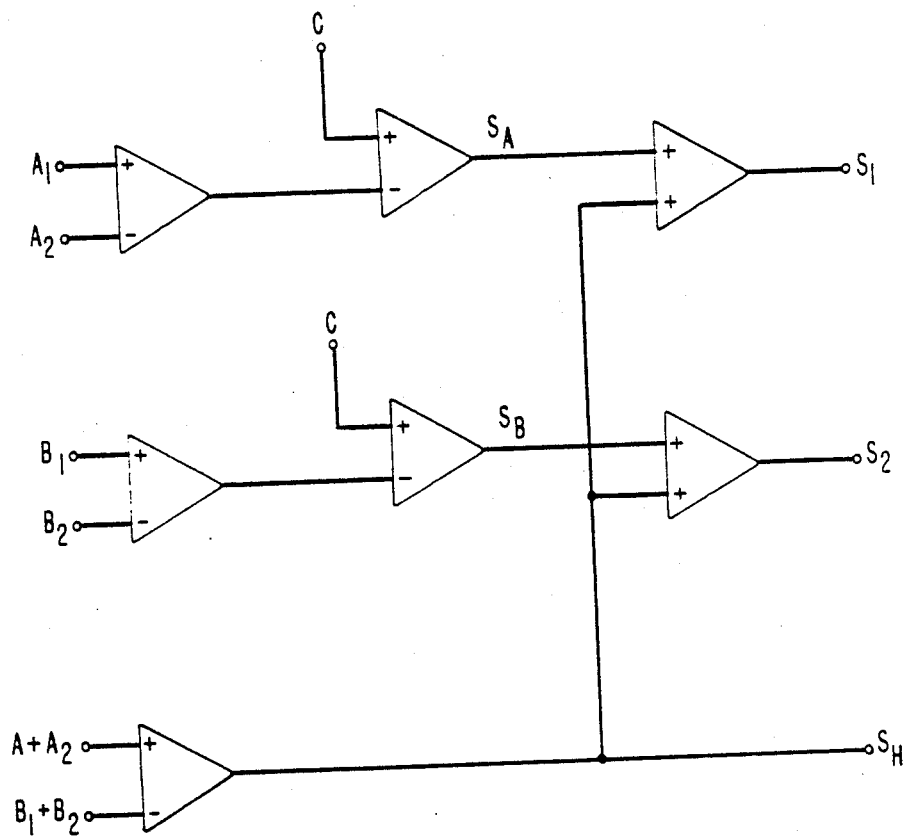
Figure 11:
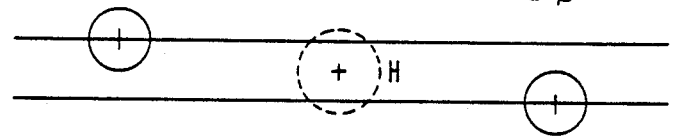
FIG. 11a is a view of a typical simplified positional representation of the light spots at an indicated track strip, that is, of the radial delineation of sequences of pits of an informational track.
FIG. 11b is a representation analogous to FIG. 11a, however with deviations of the auxiliary luminous spots from the ideal position.
FIG. 11c is a representation analogous to that of FIG. 11a where one of the auxiliary luminous spots deviates from the ideal position.
Figure 11:
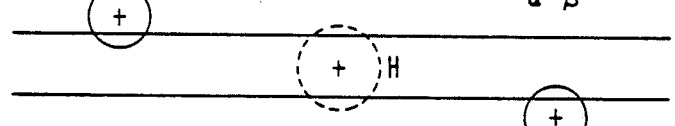
Figure 11:
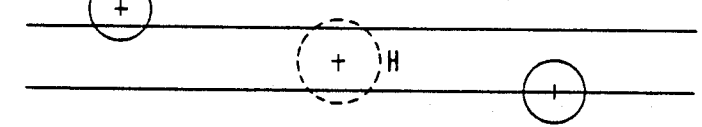

The block circuit diagram illustrated in FIG. 10 starts with the known separation of the detectors for the auxiliary light spots 13 and 15, which provide detection signals $A_1$, $A_2$, $B_1$, $B_2$ as shown in FIG. 10 a depending on the light intensity impinging. The signals A1, A2, B1, B2 as well as the sums $A_1+A_2$ or $B_1+B_2$ are applied at the inputs of the input differential amplifier. The control signals for mirror parts sections for the auxiliary lights puts 13 and 15 and $S_1$ and $S_2$. The signal $S_1$ and $S_2$ are generated by different formation with the reference signal C and addition of the difference of $A_1+A_2$ and $B_1+B_2$. The latter difference forms in a known way the control signal $S_H$ for the drive of the converter for the main lights spot 14.

The following conditions result for the tangent error angle and the resulting control signal:

1. If the angle $\alpha$ is equal to the angle $\beta$ and $S_A$ is equal to $S_B=0$, then all three converters are driven with the control signal $S_H$. In this case $S_A=C-(A_1-A_2)$ and $S_B=C-(B_1-B_2)$.

2a. If the angle $\alpha$ is equal to the angle $\beta$ and the control signal $S_A=S_B$, but both signals are unequal to 0 then the control signals for the mirror parts sections of the auxiliary luminous spots 13 and 15 are formed from the control signals $S_H+S_A$ and $S_H+S_B$.

2b. If the angle $\alpha$ is unequal to the angle $\beta$ and the control signal $S_A$ is unequal to the control signal $S_B$ then again the control signals are obtained by $S_H+S_B$ or, respectively $S_H+S_A$.

It is to be mentioned that the case can occur where it makes sense to add to the outputs of the block circuit diagram of FIG. 10 both a control signal of 10 Kilohertz as well as the memory output signals of FIG. 9.

Of course, it is also possible to employ the part mirrors as fully reflecting mirrors, in case one takes care that a predisposed partially transparent mirror is disposed such that the reflected light beam bundles are directed here to the detectors.

It will be understood that each of the elements described above, or two or more together, may also find a useful application in other types of system configurations and track follower systems for correcting tangent errors in optical record scanning systems differing from the types described above.

While the invention has been illustrated and described as embodied in the context of a track follower system for correcting tangent errors in an optical record scanning system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A radially acting track follower device for optical scanning of the surface of a record of a playback apparatus comprising
   a light source;
   means for bundling the light originating from the light source;
   a rotatable phase grating disposed in the path of the light coming from the light source and generating three luminous spots disposed approximately on a straight line;

a planar three part reflection mirror where each of the parts can be controlled as to its position forming a position adjustable reflection mirror system for reflecting the light from the light source such that three luminous spots are generated on the record where the position of the spots is adjustable relative to the tangent of the track sensing location;

detection means for the light reflected from the record at the said luminous spots;

an electronic processing means for the signals generated in the detection means, where the center spot causes the generation of the use signal and where the auxiliary outer spots cause the generation of control signals for the radial track follower system;

electromechanical converters connected to the electronic processing means, which converters are individually settable for adjusting the position of at least the outer parts of the three part reflection mirror for varying the angle formed by the connection line from the center point of the respective auxiliary light spot to the center point of the main light spot and the tangent at the optimum track sensing position of the main light spot.

2. The radially acting track follower device according to claim 1 wherein said detection means has an output providing a signal resulting from the center spot; and further comprising means for controlling the focussing connected to the detection means.

3. The radially acting track follower device according to claim 1 wherein the electromechanical converters connected to the electronic processing means are individually settable such that the auxiliary light spots impinge the record surface about in track direction at about equal distance from the main center spot, radially opposite to each other and displaced by about equal amounts.

4. The radially acting track follower device according to claim 1 further comprising means for tilting the outer parts of the reflection mirror.

5. The radially acting track follower device according to claim 1 further comprising means for shifting the outer parts of the reflection mirror driven by the electromechanical converter.

6. The radially acting track follower device according to claim 1 wherein the electromechanical converters of the two outer parts of the mirror are excited by a control signal with a frequency of more than 1000 Hertz.

7. The radially acting track follower device according to claim 1 further comprising means for oscillating the two outer auxiliary light spots by at most about 0.1 micrometer in a substantially radial, but opposite direction with respect to each other based on a corresponding control of the electromechanical converters.

8. The radially acting track follower device according to claim 1 further comprising means for coordinating the position of the auxiliary luminous spots for the track follower control to the detection means and further comprising an adding means for adding the signals resulting from the two outer parts of the reflection mirror such that in case of an optimal position of the two auxiliary light spots relative to the track to be scanned a sum signal S equal to 50 percent results and an angular shifting results in a shift of the control signals in each case in a positive direction or a negative direction and where the thus determined control signal S controls the movable reflection mirror parts correspondingly.

9. The radially acting track follower device according to claim 1 further comprising a read only memory for storing typical scanning error or proportional angle deviations for certain scanning radii of a certain record playback apparatus;

a digital to analog converter connected to an output of the read-only memory, where the output signal of the digital to analog converter provides the control parameter for the controllable mirror parts, where both during regular operation as well as for a search finder run the accumulated time available from the information on the record is calculated as a binary signal sequence.

10. The radially acting track follower device according to claim 9 wherein blocks comprising eight individual bits are employed as an address for the read only memory ROM.

11. The radially acting track follower device according to claim 1 further comprising brackets disposed between a respective mirror part and the electromechanical converter for mounting the mirror part and for transmitting the motion generated in the electromechanical converter to the mirror part.

12. The radially acting track follower device according to claim 1 wherein the detection elements are formed from at least two individually sensing detection elements for each of the outer parts of the reflection mirror.

13. The radially acting track follower device according to claim 1 wherein the parts of the reflection mirror are semitransparent mirror parts.

14. A method for radially tracking a track on a record with an optical track follower device comprising generating light in a light source;

scattering coherently the light coming from the light source with a phase grating to provide three beams of light;

focussing the light coming from the phase grating onto a reflection mirror system comprising at least three parts;

forming three separate luminous spots each corresponding to a one of the light beams on the surface of a record, where the luminous spots are disposed approximately along a straight line running at a certain angle relative to the tangent of the respective track on the surface of the record;

collecting the light reflected from the record surface onto detection elements; and processing signals coming from the detection elements to generate a use signal and correction signals for adjusting the positions of the reflection mirror parts to assure a stable following of the track by the luminous spots.

15. The method for radially tracking a track on a record with an optical track follower device according to claim 14 further comprising adjusting the angle between the approximate straight line connecting the light spots and the tangent of the track on the record.

16. The method for radially tracking a track on a record with an optical track follower device according to claim 14 further comprising focussing the luminous spots on the surface of the record depending on the characteristics of the signal received by a detection element, which corresponds to the center part of the reflection mirror.

17. The method for radially tracking a track on a record with an optical track follower device according to claim 14 further comprising
joining the signals coming from the detection elements such that one resulting signal represents a parallel codirected motion of the two outer part reflection mirrors and wherein another resulting signal represents a parallel oppositely directed motion of the two outer reflection mirror parts.

18. The method for radially tracking a track on a record with an optical track follower device according to claim 14 further comprising
exciting the two outer reflection mirror parts with a control signal having a frequency of more than 1000 Hertz with a resulting motion of not more than about 0.1 micrometer.

19. The method for radially tracking a track on a record with an optical track follower device according to claim 14 further comprising
storing scanning error typical and/or proportional angle deviations corresponding to certain scanning radii in a memory storage;
converting a signal coming from the memory storage with a digital to analog converter;
feeding an output signal of the digital to analog converter as a control parameter to a drive mechanism of the position controlled reflection mirror parts; and
calculating binary signal sequences from the time passed by the running of the record to coordinate the values stored in the memory storage and the position on the record.

* * * * *